Figure 1:
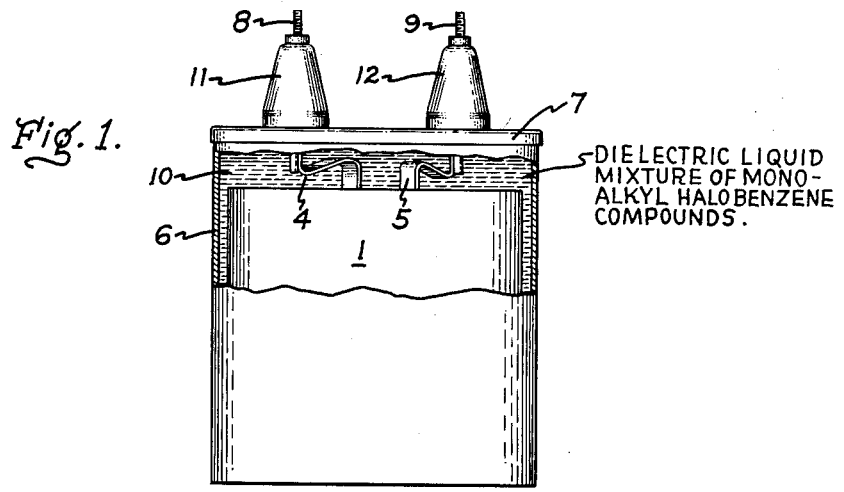

DIELECTRIC LIQUID MIXTURE OF MONO-ALKYL HALOBENZENE COMPOUNDS.

Inventors,
Raymond S. Martin,
Joseph E. Petley,
by Gilbert P. Tarleton
Their Attorney.

United States Patent Office 2,983,856
Patented May 9, 1961

2,983,856

ELECTRICAL DEVICE AND DIELECTRIC MATERIAL THEREFOR

Raymond S. Martin, Hudson Falls, and Joseph E. Petley, Troy, N.Y., assignors to General Electric Company, a corporation of New York Filed June 26, 1957, Ser. No. 668,058

6 Claims. (Cl. 317—258)

The present invention relates to electrical devices and dielectric material therefor, and more particularly relates to electrical capacitors having a dielectric liquid which confers improved electrical characteristics and prolonged life thereon under severe operating conditions.

Liquid dielectric materials have been used in many cases heretofore in electrical capacitors in preference to solid or resinous types of dielectrics for various reasons. In general, liquids more easily and thoroughly impregnate the capacitor assemblies and are not subject to failures such as caused by voids in the solid dielectric materials. Also, solid organic dielectrics are usually characterized by relatively low dielectric constants and consequently lower capacitance values are obtained in capacitors having such dielectrics.

However, dielectric liquids used heretofore for capacitors, such as mineral oil, the halogenated aromatic compounds known as askarels, and other known dielectric liquids, have not been found to have fully satisfactory characteristics at the extremely low temperatures to which capacitors are presently being subjected. Certain of these liquids, such as mineral oils, have low dielectric constant in general, and others such as the askarels suffer a marked capacitance drop at extremely low temperatures.

It is an object of the present invention to provide electrical devices having an improved dielectric material which avoids the disadvantages of the known dielectric compositions.

It is a further object of the invention to provide electrical capacitors incorporating a dielectric liquid which confers thereon improved electrical characteristics and prolonged life under a wide range of operating conditions, and particularly at extremely low temperatures.

It is further object of the invention to provide a dielectric liquid for electrical devices, and particularly electrical capacitors, which confers improved capacitance properties on the capacitor at extremely low temperatures, is adapted for use at high operating temperatures, and is suitable for the low pressure, high temperature impregnating processes usually employed in the manufacture of capacitors.

With the above objects in view, the present invention relates to an electrical device, particularly an electrical capacitor, comprising the combination of spaced conductors having interposed therebetween a dielectric liquid comprising a mixture of mono-alkyl nuclear halogenated benzene compounds wherein the alkyl group contains from about 10 to 15 carbon atoms, with preferably an average of about 12 carbon atoms.

Figure 2:
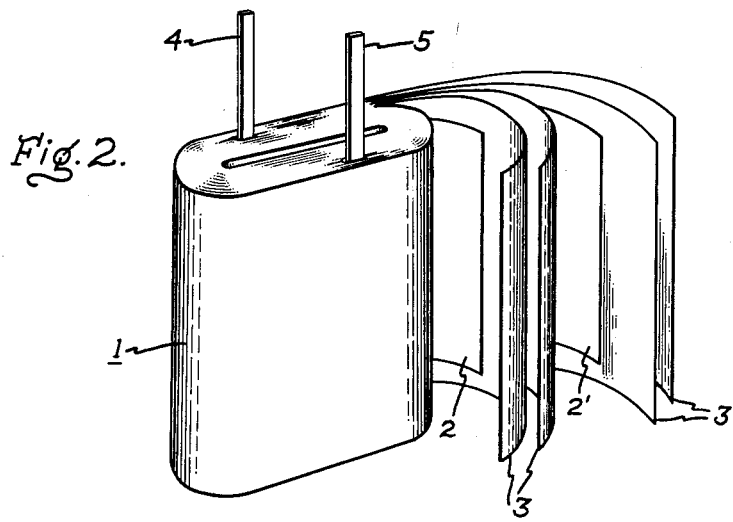

The invention will be better understood from the following description taken in conjunction with the accompanying drawing, in which:

Fig. 1 is an elevational view of a sealed rolled type capacitor; shown partly broken away, to which the present invention is applicable; and Fig. 2 is a perspective view of the wound capacitor section of the Fig. 1 device showing the section partly unrolled.

Referring now to the drawing, there is shown a capacitor device comprising a rolled capacitor section 1 made up in conventional arrangement of wound alternate layers of metal foil 2, 2' and dielectric sheets 3. The metallic foils 2, 2' serve as the capacitor electrodes or armatures and may be composed of aluminum, copper, tantalum, lead, tin, or any other known or suitable types of capacitor electrode material. Instead of separate foil and insulation sheets, sheets of metalized paper or equivalent material would be used to form the capacitor roll. Electrical contact with the armatures 2, 2' is made by tap straps 4, 5 of electrically conducting material which are applied to the armatures and project from the end of the capacitor section. The interleaved dielectric spacers 3 may be composed of one or more sheets ranging in thickness from 0.2 to 5 mils and preferably consist of a cellulosic material such as kraft paper, although other types of dielectric spacer material such as sheets of reconstructed mica, synthetic resins or other known or suitable types of dielectric material may be used, or composite dielectric spacers of any suitable combination of such sheets may be employed.

The wound capacitor section 1 is enclosed in casing 6 provided with a cover 7 and containing a dielectric liquid 10, more fully described herein, substantially filling the casing and impregnating the wound capacitor section. On cover 7, which hermetically seals the interior of the casing 6, there are arranged bushing insulators 11, 12 on which are mounted terminals 8, 9 respectively connected to tap straps 4, 5.

Capacitors of known constructions other than that shown could be used, for example, those having exposed armature foils in which tap straps may be dispensed with.

In the manufacture of the capacitor described, the assembly of wound electrode foils and dielectric spacer may, is desired, be first impregnated in the liquid dielectric medium 10 under conditions which cause it to thoroughly impregnate the dielectric sheets, the impregnated assembly is then placed in the capacitor casing, and additional dielectric liquid introduced, after which the casing is fluid-tightly sealed by the cover 7. Alternatively, the unimpregnated capacitor roll section 1 may be initially placed in the capacitor casing 6 and then inpregnated, in accordance with known practice, after introducing the liquid dielectric medium in the casing in a manner to substantially fill the casing and any voids in the capacitor roll section. Thereafter, the casing is sealed.

The dielectric material 10, in accordance with the invention, is a liquid comprising a mixture of mono-alkyl nuclear halogenated benzene compounds wherein the alkyl group contains about 10 to 15 carbon atoms with an average of about 12 carbon atoms and may be a straight chain or branched group. This material has been found to impart unexpectedly improved properties to capacitors especially under very low temperature conditions, and its general characteristics make it a superior dielectric liquid for capacitors from several standpoints. The following properties were found to characterize an alkylated chlorobenzene product having an average of one chlorine atom per benzene nucleus and which proved eminently satisfactory for the present purposes:

TABLE I

| | |
|---|---|
| 60 cycle dielectric constant—100° C | 3.17 |
| 60 cycle percent power factor—100° C | 0.1 |
| 1000 cycle dielectric constant—100° C | 3.23 |
| 1000 cycle percent power factor—100° C | 0.01 |
| Resistivity, ohm-c.—100° C | $75.4 \times 10^{12}$ |
| Pour point ° C | −50 |
| Flash point ° C | 165 |
| Fire point ° C | 172 |

Of particular significance was the discovery that the alkylated chlorobenzene mixture of the present invention retains nearly all its room temperature capacitance even when tested at temperatures as low as −55° C. In one test demonstrating this feature, three capacitor units containing the dielectric mixture of the invention were subjected to a temperature of −55° C. in a cold box after their room temperature capacitance was determined, and after being held in the cold box for 87 hours they were tested for capacitance at −55° C. It was found that the three units retained, respectively, 94.1, 94.4, and 95.5% of room temperature capacitance, an average of 94.6% of capacitance retained. These were remarkably good results when compared, for example, to the behavior of capacitors impregnated with conventionally used askarel dielectric liquids, since the latter lose approximately 30% of their room temperature capacitance as the temperature falls to about their solidification temperature, i.e., about 10° C. to −19° C. Moreover, in addition to having a very low pour point as shown above, the present dielectric liquid mixture appears to have a very wide liquidus range and retains its liquid character for prolonged periods at extremely low temperatures.

A further noteworthy feature of the present dielectric liquid is its relatively high boiling range of about 305–330° C., which makes it usable without appreciable loss in the low pressure, high temperature impregnation processes customarily employed in making capacitors of this type. For example, at a pressure of about .8 mm. Hg and a temperature of about 100° C. which are typically used in capacitor impregnating procedures, little or no loss of the present dielectric liquid resulted.

In a test conducted to demonstrate the life characteristics of capacitors incorporating the present dielectric liquid as compared to units impregnated with a conventional askarel dielectric liquid, capacitors were used which were identically constructed of wound sections formed of two sheets of aluminum foil 0.25 mil thick separated by three sheets of kraft paper 0.4 mil thick. None of the twelve capacitor units tested incorporating the present dielectric liquid failed after more than 1030 hours under the test conditions of 125° C. and 1000 volts D.C., whereas all the six tested units having the askarel liquid failed before 500 hours, the average life being 271 hours. The improvement in capacitor life characteristics provided by the present dielectric liquid is thus shown to be at least four-fold.

The present dielectric liquid material may be prepared using known Friedel-Crafts procedures by reacting chlorinated benzene or mixture of chlorinated benzenes in the presence of a Friedel-Crafts catalyst (e.g., aluminum chloride) with a mixture of olefins as the alkylating agent containing an average of about 12 carbon atoms within a range of 10–15 carbon atoms.

The dielectric liquid may also be prepared by conventional alkylation procedures to provide a reaction between benzene and a mixture of hydrocarbons or olefins having a range of 10–15 carbon atoms using a Friedel-Crafts catalyst, and then chlorinating the alkylated hydrocarbon mixture.

The compounds obtained in accordance with the invention comprise chiefly a mixture of mono-alkylated mono-chlorobenzene products. However, mono-alkyl dichlorobenzene compounds have also proved suitable in accordance with the invention, although they are not as satisfactory as the mono-chlorobenzene compounds at the extremely low temperatures around −55° C., and the final mixture may contain either or both types of chlorinated benzene compounds. Although good results in the case of the mono-chlorobenzene materials have been obtained where the chlorine atom was attached to the benzene nucleus in a position para to the alkyl group, the invention is not limited to this arrangement, since the chlorine atom or atoms may be attached on the ring in any position with respect to the alkyl group or to themselves. Moreover, halogens other than chlorine may be substituted on the benzene ring, such as fluorine. In any case, however, substitution of the halogen is made on the benzene nucleus, since substitution on the alkyl side-chain would be detrimental for the present purposes.

In addition to the above mixtures, the final product may also contain small proportions of halo aromatic hydrocarbons and alkylated aromatic hydrocarbons. The alkylation and halogenation processes, however, should be carefully controlled to avoid so far as possible the poly-substitution on the benzene ring of either the halogen or alkyl group, in order to avoid raising the viscosity or pour point, or both, of the dielectric liquid.

A commercially available mixture of alkylated benzene compounds wherein the alkyl groups have 10–15 carbon atoms and an average of about 12 carbon atoms, and which has been found particularly suitable as a starting material in preparing the present dielectric liquid is marketed under the name Alkane by the Oronite Chemical Company.

The following are typical examples of methods which may be used in producing the dielectric liquid mixtures of the present invention, it being understood that the particular procedures and compositions described are merely illustrative and not intended to limit the scope of the invention in any way:

Example I 592 grams of Oronite Alkane is reacted at −10 to 10° C. with 140 grams chlorine gas using 10 grams of carbonyl iron as catalyst. When the reaction is complete, the reaction product is filtered to remove the iron and washed free of ionic impurities. This product is then refined with hot dry fuller's earth and then introduced into the capacitor.

Example II

Two mols of Oronite Alkane are reacted with two mols of sulfuryl chloride at 0 to 10° C. using 1% of a catalyst consisting of a 50–50 mixture of aluminum chloride and sulfur mono-chloride. The reaction product is washed with concentrated hydrochloric acid to remove sulfur compounds, and this product is then washed to remove hydrochloric acid and then refined as in Example I above.

There are thus provided by the invention electric capacitors which maintain relatively constant capacity over a wide temperature range, i.e., −55° C. to 125° C., and which have superior life characteristics under such severe operating conditions. Moreover, the dielectric liquid of the present invention by virtue of its high boiling temperature range is well adapted to the customary high vacuum, elevated temperature impregnating processes usually used in making the capacitors without appreciable loss of the liquid being encountered.

Although the present dielectric liquids have been found eminently suitable for capacitor application as described above, they are not limited to such use, and they may find effective application in other electrical devices such as transformers, switchgear and the like. The stable liquid character and electrical properties of the present dielectric material over a wide range of temperature as described likewise provides substantial benefits in such electrical devices, which are often subjected to a wide variation of operating conditions, and the dielectric strength of these dielectric liquids, which is as high or higher than conventionally used dielectric liquids, further makes them adapted for use in such devices.

While the present invention has been described with reference to particular embodiments thereof, it will be understood that numerous modifications may be made by those skilled in the art without actually departing from the scope of the invention. Therefore, the appended claims are intended to cover all such equivalent variations

What we claim as new and desire to secure by Letters Patent of the United States is:

1. An electrical device comprising in combination spaced conductors normally charged with unlike electrical potentials, and a dielectric liquid interposed between said conductors, said dielectric liquid consisting essentially of a mixture of alkyl nuclear halogenated benzene compounds having alkyl groups containing from 10 to 15 carbon atoms and having from 1 to 2 halogen atoms on the benzene ring.

2. An electrical capacitor comprising in combination cooperating armatures, and dielectric material interposed between said armatures consisting essentially of a mixture of alkyl nuclear halogenated benzene compounds wherein the alkyl group contains from 10 to 15 carbon atoms and having from 1 to 2 halogen atoms on the benzene ring.

3. An electrical capacitor comprising in combination cooperating armatures, dielectric spacer material interposed between said armatures, and dielectric liquid material impregnating said dielectric spacer material and filling the voids in the capacitor, said dielectric liquid material consisting essentially of a mixture of mono-alkyl chlorobenzene compounds wherein the alkyl group contains from 10 to 15 carbon atoms with an average of about 12 carbon atoms and having from 1 to 2 chlorine atoms on the benzene ring.

4. A dielectric material consisting essentially of a liquid mixture of alkyl nuclear halogenated benzene compounds having alkyl groups containing 10–15 carbon atoms and having from 1 to 2 halogen atoms on the benzene ring.

5. A dielectric material consisting essentially of a liquid mixture of mono-alkyl chlorinated benzene compounds wherein the alkyl groups contain 10–15 carbon atoms with an average of about 12 carbon atoms and having from 1 to 2 chlorine atoms on the benzene ring.

6. Dielectric material comprising impregnable dielectric sheet material impregnated with a dielectric liquid consisting essentially of a mixture of alkyl nuclear chlorinated benzene compounds having alkyl groups containing 10–15 carbon atoms and having from 1 to 2 chlorine atoms on the benzene ring.

References Cited in the file of this patent

UNITED STATES PATENTS

| | | |
|---|---|---|
| 2,041,594 | Clark | May 19, 1936 |
| 2,139,948 | Ford | Dec. 13, 1938 |
| 2,139,964 | Levine | Dec. 13, 1938 |
| 2,171,855 | Devine et al. | Sept. 5, 1939 |
| 2,174,069 | Dreisbach | Sept. 26, 1939 |
| 2,174,289 | Devine et al. | Sept. 26, 1939 |
| 2,233,404 | Dreisbach | Mar. 4, 1941 |
| 2,361,590 | Biggs | Oct. 31, 1944 |
| 2,694,738 | Rucker | Nov. 16, 1954 |

OTHER REFERENCES

Beilstein: "Handbuch der Organischen Chemie," 4th edition, publication 1922, by J. Springer of Berlin, vol. 5, page 473.